United States Patent [19]

Takizawa et al.

[11] 4,285,310

[45] Aug. 25, 1981

[54] DUAL INTAKE VALVE TYPE INTERNAL COMBUSTION ENGINE

[75] Inventors: Masaaki Takizawa, Mishima; Noboru Matsubara; Kazuo Takahashi, both of Susono, all of Japan

[73] Assignee: Toyota Jidosha Kogyo Kabushiki Kaisha, Aichi, Japan

[21] Appl. No.: 28,823

[22] Filed: Apr. 10, 1979

[30] Foreign Application Priority Data

May 25, 1978 [JP] Japan ................... 53-61733

[51] Int. Cl.³ .................. F02B 31/02; F02B 25/00
[52] U.S. Cl. .................. 123/308; 123/90.16; 123/90.55; 123/432
[58] Field of Search ............. 123/26, 30 C, 30 D, 123/75 B, 124 R, 90.43, 90.55, 188 M, 188 S, 90.16

[56] References Cited

U.S. PATENT DOCUMENTS

| | | | |
|---|---|---|---|
| 701,505 | 6/1902 | Reichenbach | 123/75 B |
| 2,244,214 | 6/1941 | Pescara | 123/119 DB |
| 2,316,618 | 4/1943 | Pyatt | 123/432 |
| 3,154,059 | 10/1964 | Witzky et al. | 123/308 X |
| 3,157,166 | 11/1964 | MacNeil | 123/90.16 |
| 3,742,921 | 7/1973 | Rendine | 123/90.55 X |
| 3,945,363 | 3/1976 | Elsbett et al. | 123/188 M |
| 4,014,300 | 3/1977 | Klomp | 123/75 B X |
| 4,133,331 | 1/1979 | Otsubo et al. | 123/30 C X |
| 4,134,371 | 1/1979 | Hausknecht | 123/90.43 |
| 4,181,105 | 1/1980 | Takemoto et al. | 123/30 C X |
| 4,211,189 | 7/1980 | Hamai | 123/308 |

Primary Examiner—Tony M. Argenbright
Attorney, Agent, or Firm—Armstrong, Nikaido, Marmelstein & Kubovcik

[57] ABSTRACT

A dual intake valve type internal combustion engine comprises a main intake valve and an auxiliary intake valve. The main intake valve is so constructed that the combustible gas mixture introduced into the combustion chamber therethrough is caused to generate a swirl motion. A variable valve lift type of auxiliary intake valve is constructed, and the valve lift of the auxiliary intake valve is varied in accordance with the changes in the engine operating conditions.

6 Claims, 10 Drawing Figures

DUAL INTAKE VALVE TYPE INTERNAL COMBUSTION ENGINE

BRIEF DESCRIPTION OF THE INVENTION

This invention relates to a structure of an internal combustion engine which has a combustion chamber provided with a plurality of intake valves. Especially, this invention relates to an internal combustion engine wherein sufficient turbulence can be generated in the combustible gas mixture within a combustion chamber while the engine load is light and wherein a sufficient amount of combustible gas mixture can be introduced into the combustion chamber while the engine load is heavy.

It should be noted that, in this specification, the terms "combustible gas mixture" and "intake gas" are used to mean not only the usual combustible gas mixture but also a combustible gas mixture including recirculated exhaust gas therein and a combustible gas mixture which is leaner than the usual combustible gas mixture.

BACKGROUND OF THE INVENTION

Disclosed in Japanese Patent Publication No. 31724-72, Japanese Utility Model Publication No. 14019-75 and Japanese Utility Model Laid-open Application No. 115504-74 are internal combustion engines having combustion chambers each of which is communicated via intake valves, with two intake passages, i.e., an intake passage for a heavy load and a general intake passage, whereby intake gas is supplied through the general intake passage while the engine load is light; otherwise, intake gas is supplied through both general and heavy load intake passages while the engine load is heavy. In addition, disclosed in Japanese Patent Publication No. 1725-73 is an internal combustion engine having a plurality of intake valves wherein the number of the operating intake valves is changed in accordance with changes in the operating conditions of the engine. In the engines, when the engine load is heavy, since the cross-sectional area of the intake passages can be changed in accordance with changes in the engine conditions, a large amount of combustible gas mixture can be introduced into combustion chambers. However, when the engine load is light, the combustible gas mixture cannot be burnt stably in the engines.

It is well known that, when a swirl motion is generated in a combustible gas mixture within a combustion chamber of an internal combustion engine so that a turbulence is generated in the combustible gas mixture, the combustible gas mixture can be burnt stably; as a result, the amount of harmful contaminants emitted in the exhaust gas can be reduced and the fuel consumption can also be reduced. However, in the known engines, there is a problem in that the maximum output of the engine is low. This is because if a sufficient turbulence is generated by creating a swirl motion in the combustible gas mixture while the engine load is light, a sufficient amount of combustion gas mixture cannot be introduced into combustion chambers while the engine load is heavy.

To overcome such a problem, in Japanese Patent Laid-open Application No. 148718-77, a diesel engine is disclosed wherein two intake passages are communicated with a combustion chamber via intake valves. Only one of the two intake passages has a throttle valve which is closed when the engine load is light, and the other intake passage is formed in a helical port for generating a swirl motion in the combustible gas when the engine load is light and for introducing a large amount of intake gas into combustion chambers when the engine load is high. However, since valve lifts of the intake valves in the engine are constant regardless of the engine load, satisfactory operating characteristics of the engine cannot be obtained irrespective of the operating conditions of the engine.

The principal object of the present invention is to provide an internal combustion engine which can overcome the above-mentioned problem. More specifically, the present invention provides an internal combustion engine which can obtain satisfactory operating characteristics irrespective of the operating conditions of the engine and which can generate a sufficient amount of swirl motion and turbulences in the combustible gas mixture so that the combustion gas mixture is burnt stably; as a result, a reduction of the harmful contaminants in the exhaust gas and a reduction of the fuel consumption can be achieved when the engine load is light, and which can prevent a reduction of the maximum output of the engine because a sufficient amount of the combustion gas mixture can be introduced into combustion chambers when the engine load is heavy.

In the present invention, the above-mentioned principal object is achieved by a dual intake valve type internal combustion engine wherein a main intake valve adapted to generate a swirl motion in the intake gas and an auxiliary intake valve of a variable valve lift type are communicated with a combustion chamber.

It is preferable that, in the present invention, a main intake valve is operated by a main cam having a cam profile for low speed use, in synchronization with a crankshaft of the engine, that an auxiliary valve is operated in synchronization with the crankshaft of the engine and that the valve lift of the auxiliary valve is varied in accordance with the changes in the operating conditions of the engine.

In the embodiments of the present invention which will be explained later with reference to the accompanying drawings, an auxiliary valve is operated by a swingable rocker arm, the fulcrum of the swinging motion of which is variable or operable by a variable valve lift mechanism including an oil tappet therein, so that the auxiliary valve is closed when the flow rate of intake gas is small. However, it should be noted that not only the variable valve lift mechanisms illustrated in the accompanying drawings, but also any other known variable valve lift mechanisms may be applied to the present invention. In addition, it should also be noted that various types of known valve mechanisms which can generate a swirl motion in the combustible gas mixture are applicable to a main intake valve of the present invention.

In the attached drawings, three embodiments of the main valves are shown, i.e. (i) in the first embodiment, the main intake valve is communicated with a main intake port which is shaped into a helical port so as to generate a swirl motion while the combustible gas mixture passes therethrough, (ii) in the second embodiment, a main intake valve has a shroud formed on the back thereof for generating a swirl motion while the combustible gas mixture passes along the shrouds and (iii) in the third embodiment, a projection surrounding a part of the main intake valve is formed on the wall of the combustion chamber for increasing the flow resistance between the projection and the main intake valve so that the flow of the combustible gas mixture through a portion not surrounded by the projection creates a swirl motion.

Some embodiments of the present invention will now be explained with reference to the accompanying drawings.

DETAILED DESCRIPTION OF THE INVENTION

Figure 1:
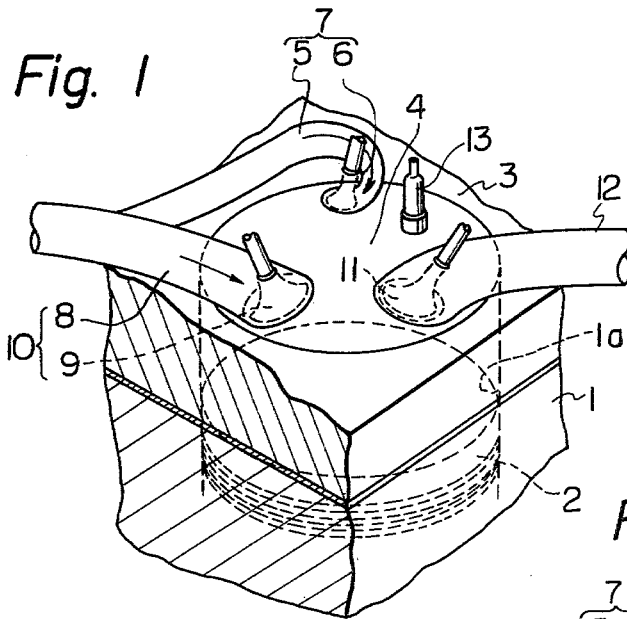
FIG. 1 is a perspective view illustrating one cylinder of an internal combustion engine according to the present invention.

Referring to FIG. 1, which diagrammatically illustrates one cylinder of an internal combustion engine according to the present invention, it should be noted that the internal combustion engine according to the present invention has a plurality of such cylinders. A cylinder block 1 has a cylinder bore 1a formed therein which sealingly and slidably engages with a piston 2 inserted therein. A cylinder head 3 which has a combustion chamber recess (not shown) formed thereon is mounted on and secured to the cylinder block 1 so that a combustion chamber 4, which is surrounded by the cylinder bore 1a, the combustion chamber recess and the top surface of the piston 2, is formed. The combustion chamber 4 is communicated with a combustible gas mixture preparing device, such as a carburetor (not shown), via a main intake passage 7 comprising a main intake port 5 and a main intake valve 6, and via an auxiliary intake passage 10 comprising an auxiliary intake port 8 and an auxiliary intake valve 9. The auxiliary intake port 8 branches from the main intake port 5. The combustion chamber 4 is communicated with an exhaust pipe (not shown) via an exhaust valve 11 and an exhaust port 12 so that the burnt gas in the combustion chamber 4 is exhausted into the exhaust pipe. A spark plug 13 connected to a high voltage power source (not shown) is secured to the combustion chamber 4.

In the embodiment illustrated in FIG. 1, the main intake port 5 communicating with the main intake valve 6 is shaped helically so that the intake combustible gas mixture introduced through the main intake port 5 and the main intake valve 6 generates a swirl motion.

Figure 3:
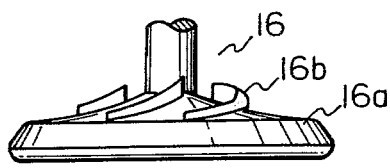
FIG. 3 is an elevational view of a main intake valve installed in the engine illustrated in FIG. 2.
Figure 4:
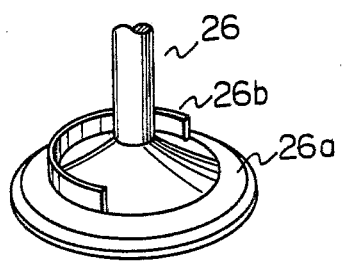
FIG. 4 is an elevational view of another main intake valve.
Figure 5:
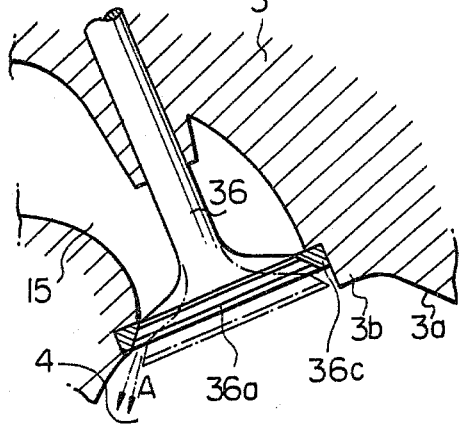
FIG. 5 is an elevational view of a still another main intake valve.

The main intake valve and the main intake port may have other constructions which are different from that of the first embodiment, so long as such constructions can generate a swirl motion in the introduced combustible gas mixture. For example, a main intake port 15 is shaped in a straight port illustrated in FIG. 2, and a main intake valve 16 (26, 36) may be constructed as follows. The main intake valve 16 in FIG. 3 has a helically-shaped vane 16b formed on the back surface of the valve body 16a. The main intake valve 26 in FIG. 4 has an arc-shaped shroud 26b formed on a part of the back surface of the valve body 26a. The combustible gas mixture introduced through the main intake port 15 illustrated in FIG. 2 generates a swirl motion as it passes by the vane 16b (FIG. 3) or by the shroud 26b formed on the back surface of the valve body 16a (FIG. 3) or 26a of the main intake valve (FIG. 3) 16 or 26. A projection or mask 3b in FIG. 5 is formed on the combustion chamber recess 3a located outside of a valve seat 36c which engages with the valve body 36a of the main intake valve 36, and the projection 3b surrounds a part of the valve body 36a. When the main intake valve 36 is opened as illustrated by the dot-dash lines in FIG. 5, since the valve body 36a is positioned to be close to the projection 3b, the flow resistance therebetween is high. As a result, the combustible gas mixture introduced through the main intake port 15 spouts into the combustion chamber 4 through the portion where the projection 3b is not formed in a predetermined direction (as illustrated by the dot-dash arrows A in FIG. 5) and thus generates a swirl motion.

Figure 6:
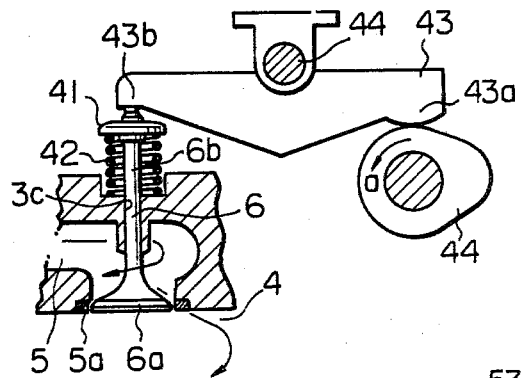
FIG. 6 is an elevational view of an operating mechanism of the main intake valve installed in the engine illustrated in FIG. 1 or 2.

The main intake valve 6, 16, 26 or 36 is operated by means of a well-known valve-driving mechanism and has a constant valve lift. One example of the valve-driving mechanism is illustrated in FIG. 6.

At the portion where the helical type main intake port 5 as illustrated in FIG. 1 communicates with the combustion chamber 4, a valve seat 5a is disposed so that the valve body 6a of the main intake valve 6 cooperates with the valve seat 5a, so as to control the flow of the intake gas. A valve rod 6b fixed to the valve body 6a is sealingly and slidably inserted into an engaging hole 3c formed in the cylinder head. A retainer 41 is secured to the upper portion of the valve rod 6b, which upper portion projects from the cylinder head 3. A compression spring 42 is disposed between the retainer 41 and the upper surface of the cylinder head 3 so that the valve body 6a is pressed against the valve seat 5a. A rocker arm 43 is swingably pivoted to a fixed rocker shaft 44. A rocker arm pad 43a which is formed at one end of the rocker arm 43 abuts against a main cam 54 which is rotated in a direction "a" in synchronization with the crankshaft of the engine (not shown), and the other end 43b of the rocker arm 43 presses against the upper portion of the valve rod 6b so that the main intake valve 6 is operated in synchronization with the crankshaft (not shown).

The auxiliary intake valve 9 is operated by a valve-driving mechanism which varies the valve lift in accordance with the changes in the operating characteristics of the engine. According to a mechanism illustrated in FIG. 7, a valve seat 8a is disposed at a portion where the auxiliary port 8 communicates with the combustion chamber 4, and a valve body 9a of the auxiliary intake valve 9 cooperates with the valve seat 8a. A valve rod 9b fixed to the valve body 9a is sealingly and slidably inserted into an engaging hole 3d formed in the cylinder head 3. A retainer 51 is secured to the upper portion of the valve rod 9b which projects from the cylinder head 3, and a compression spring 52 is disposed between the retainer 51 and the upper surface of the cylinder head 3 so that the valve body 9a is pressed against the valve seat 8a. One end 53b of a rocker arm 53 and a rocker arm pad 53a formed at the other end of the rocker arm 53 are, respectively, in abutment with the upper portion of the valve rod 9b and an auxiliary cam 54 which is rotated in an arrow b direction in synchronization with the crankshaft of the engine (not shown). The rocker arm 53 has a shallow groove 53c extending in the lengthwise direction thereof and formed on the upper surface thereof. A movable fulcrum 56 is movably disposed between a support member 55, fixedly secured to the engine body above the rocker arm 53 so as to face the upper surface of the rocker arm 53, and the groove 53c. The fulcrum 56, which is, for example, in a circular cylindrical shape, is pivoted on a guide bar 57 so that due to the movement of the guide bar 57 by means of an advancing mechanism, such as a hydraulic cylinder 59, the fulcrum 56 can be moved between the first position illustrated by the broken lines and the second position illustrated by the solid lines. A compression return spring 58 is disposed between a projection 53d, formed on the upper surface of the rocker arm 53, and a projection 55a, formed on the support member 55, so that the rocker arm 53 can be swung about the fulcrum 56. As the position of the fulcrum 56 is varied, the valve lift of the auxiliary intake valve 9 can be varied. Especially, when the fulcrum 56 is positioned at the first position illustrated by the broken lines in FIG. 7, the valve lift of the auxiliary intake valve 9 becomes zero; as a result, the main intake valve 9 is closed.

Figure 7:
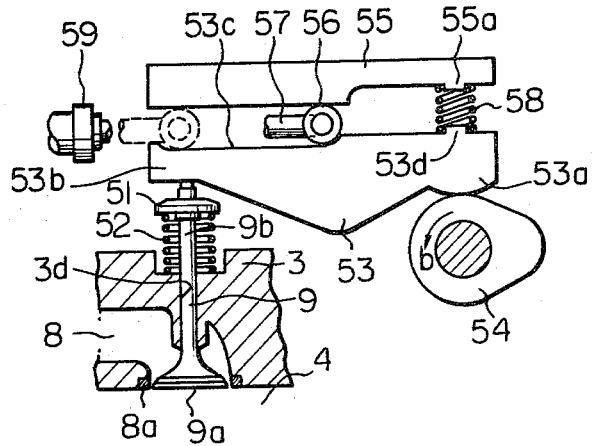
FIG. 7 is an elevational view of an operating mechanism of the auxiliary intake valve installed in the engine illustrated in FIG. 1 or 2.
Figure 8:
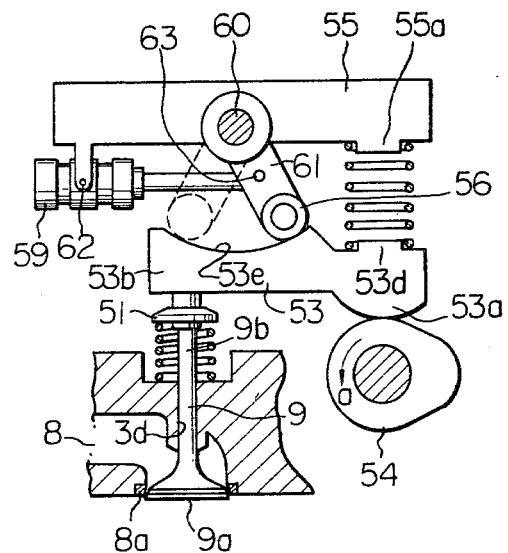
FIG. 8 is an elevational view of another operating mechanism of the auxiliary intake valve installed in the engine illustrated in FIG. 1 or 2.

Since many parts in the embodiment illustrated in FIG. 8 are very similar to those in the embodiment illustrated in FIG. 7, the same parts are designated with the same reference numerals as those in FIG. 8 and any further explanation for such similar parts will therefore be omitted from herein. A swing lever 61 is pivoted on the support member 55 by means of a pivot pin 60, and the movable fulcrum 56, which is, for example, in a circular cylindrical shape, is pivoted on the swing lever 61. A hydraulic cylinder 59 is swingably pivoted on the support member 55 by means of pins 62, and the front end of the piston rod 59a of the hydraulic cylinder 59 is pivotally connected to the swing lever 61 by means of a pin 63. Due to the operation of the hydraulic cylinder 59, the fulcrum 56 moves between the first position illustrated by broken lines and the second position illustrated by the solid lines. A recess 53e having a circular arc cross section is formed on the upper surface of the rocker arm 53 so as to facilitate the movement of the fulcrum 56. The valve lift of the auxiliary intake valve 9 illustrated in FIG. 8 can also be varied as the fulcrum 56 moves.

Figure 9:
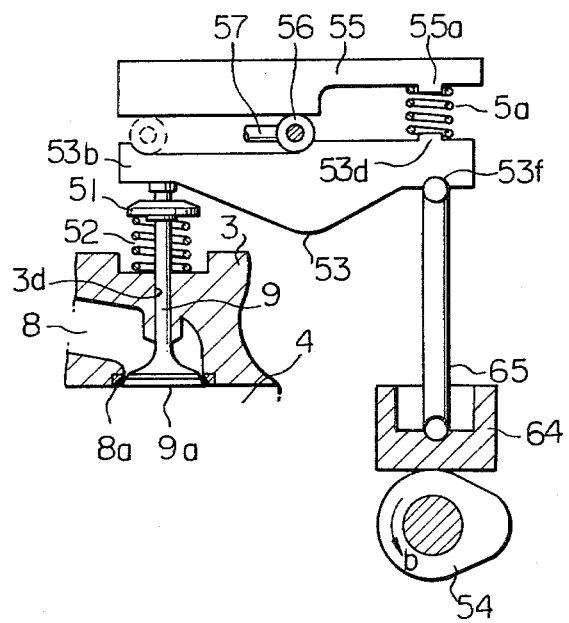
FIG. 9 is an elevational view of a still another operating mechanism of the auxiliary intake valve installed in the engine illustrated in FIG. 1 or 2.

The auxiliary intake valves 9 illustrated in FIGS. 7 and 8 are applied to engines of the overhead cam shaft type. However, these auxiliary intake valves 9 can also be easily applied to engines of the overhead valve type only after some modifications are effected to the valve-driving mechanism. An embodiment of the auxiliary intake valve applied to an engine of the overhead valve type is illustrated in FIG. 9. Since many parts of this embodiment are similar to those in the embodiment illustrated in FIG. 7, the same parts are designated by the same reference numerals as those in FIG. 7 and a detailed explanation for the similar parts has thus been omitted. Instead of the rocker arm pad 53a of the rocker arm 53 in FIG. 7, a push rod receiving recess 53f is formed on the rokcer arm 53. A lifter 64 and a push rod 65 are disposed between the cam 54, which is rotated in synchronization with the crankshaft of the engine (not shown), and the push rod receiving recess 53f. The movement of the cam 54 is transmitted to the auxiliary intake valve 9 via the lifter 64, the push rod 65 and the rocker arm 53. As the position of the fulcrum 56 is varied, the fulcrum of the swinging motion of the rocker arm 53 is moved and the valve lift of the auxiliary intake valve 9 is varied.

In the above-mentioned engines, when the flow of the intake gas is small because the engine is operating at a low rotating speed or at a light load, the fulcrums 56 illustrated in FIGS. 7 through 9 are positioned at the first position illustrated by the broken lines so that the valve lifts of the auxiliary intake valves 9 become zero or become very small. As a result, the auxiliary intake valves 9 are closed. Otherwise, the main intake valve 6 (FIG. 1), or 16, 26 or 36 (FIG. 2) will have a constant valve lift, and the intake gas introduced through the main intake valve 6, 16, 26 or 36 will generate a swirl motion in the combustion chamber 4 as mentioned above. Due to the swirl motion, turbulences are generated in the combustible gas mixture, and the combustible gas mixture burns stably due to the presence of such turbulences. As a result, the amounts of harmful contaminants emitted in the exhaust gas are reduced, and the fuel consumption of the engine can be reduced because the thermal energy of the fuel is fully converted into power for driving an automobile.

Figure 2:
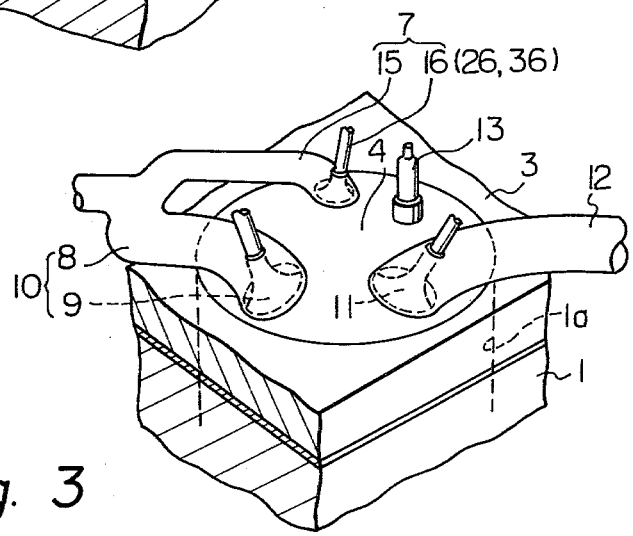
FIG. 2 is a perspective view illustrating one cylinder of another internal combustion engine according to the present invention.

As the engine operates at a high rotating speed or at a heavy load and the flow rate of the intake gas is large, the fulcrum 56 illustrated in FIGS. 7 through 9 is moved from the first position illustrated by the broken lines toward the second position illustrated by the solid lines. Then, the valve lift of the auxiliary intake valve 9 (FIGS. 1 and 2) is increased, and the auxiliary intake valve 9 is opened together with the main intake valve 6 (FIG. 1), or 16, 26 or 36 (FIG. 2). Accordingly, a sufficient amount of the combustible gas mixture is introduced into the combustion chamber 4 (FIGS. 1 and 2), and a reduction of the output at a heavy load will be prevented.

Figure 10:
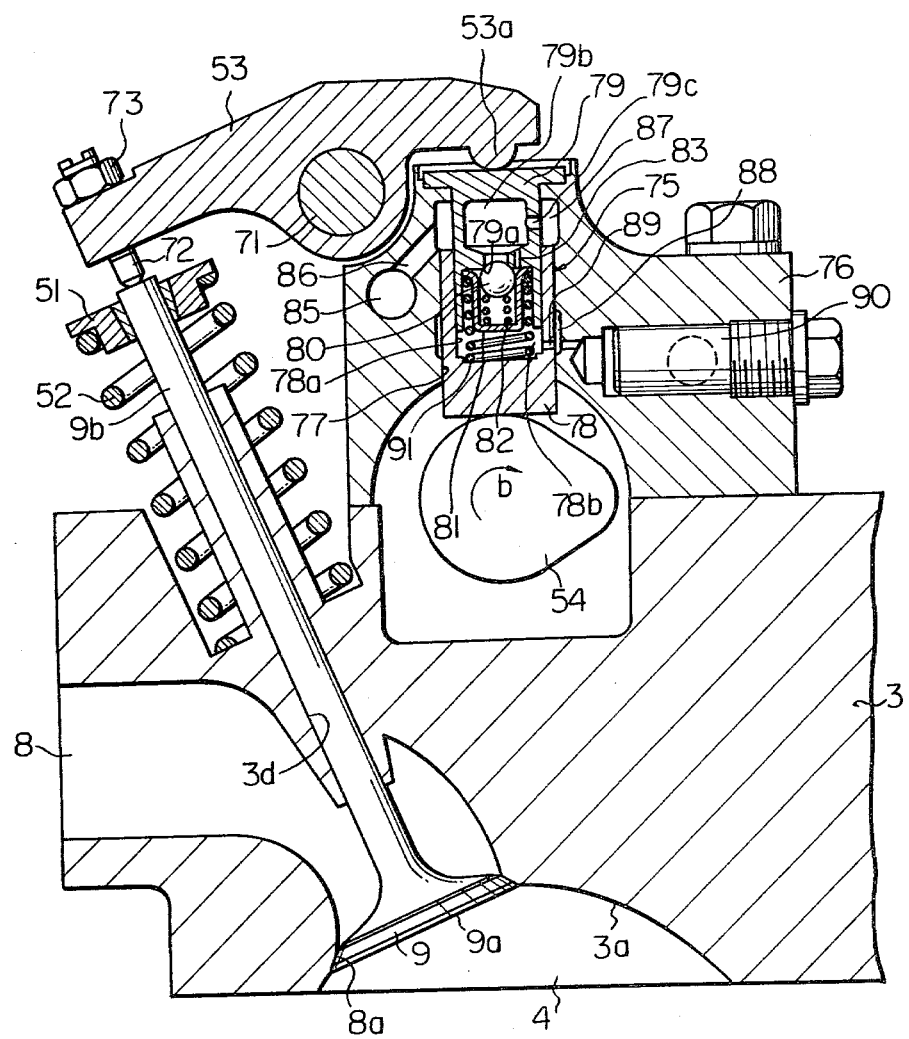
FIG. 10 is an elevational view of an operating mechanism of the auxiliary valve including an oil tappet therein.

Referring to FIG. 10, a device for controlling the valve lift of the auxiliary intake valve 9 which device includes an oil tappet as a valve lift varying mechanism will now be explained. In FIG. 10, the same parts as those shown in FIG. 7 are designated by the same reference numerals as those used in FIG. 7 and an explanation of the same parts is omitted here.

The rocker arm 53 is swingably pivoted around a rocker shaft 71, and the rocker arm 53 has a knocker 72 adjustably screwthreaded to the front end thereof by means of a lock nut 73 so that the knocker 72 presses against the upper portion of the valve rod 9b of the auxiliary intake valve 9. A rocker arm pad 53a of the rocker arm 53 and a cam 54 are in abutment with an oil tappet 75. The oil tappet 75 includes an outer hollow cylinder 78 which is slidably and sealingly inserted into a hole 77 formed in a support 76. The support 76 is secured to the upper surface of the cylinder head 3. The oil tappet 75 further includes an inner hollow cylinder 79 which is slidably and sealingly inserted into the hollow portion 78a of the outer hollow cylinder 78. A compression spring 91 is disposed between the outer and inner hollow cylinders so that the inner hollow cylinder 79 is urged upwardly relative to the outer hollow cylinder 78. A check valve 80 is disposed at a portion communicating a pressure chamber 78b formed within the outer hollow chamber 78 with an oil chamber 79b formed within the inner hollow cylinder 79. A U-shaped cross-sectional retainer 81 is fixed at the lower end of the inner hollow cylinder 79 and a compression spring 82 is disposed within the retainer 81 so that the check valve 80 is sealingly pressed against a valve seat 79a formed at the lower end of the inner hollow cylinder 79 by means of an urging force of the spring 82. An orifice 83 having a small diameter is formed at a position adjacent to the valve seat 79a so as to communicate the pressure chamber 78b with the oil chamber 79b.

A hydraulic supply source (not shown) operated by the engine is communicated with a journal 85 formed within the support 76 in a direction perpendicular to the horizontal line of FIG. 10. Pressurized oil is supplied into the oil chamber 79b from the journal 85 through a supply passage 86, an annular channel 87 surrounding the periphery of the inner hollow cylinder 79 and a small hole 79c formed on the peripheral wall of the inner hollow cylinder 79. An annular channel 88 surrounding the peripheral of the outer hollow cylinder 78 is communicated with the pressure chamber 78b via an orifice 89 having a small diameter. The annular channel is in turn communicated with a control valve device 90 which is operated by the intake vacuum in accordance with the changes in the engine load so as to return the pressuized oil in the annular channel to a hydraulic supply source (not shown).

When the cam 54 rotates and presses the outer hollow cylinder 78 upwardly, the pressure of the pressurized oil in the pressure chamber 78b is increased and the check valve 80 is closed. The pressurized oil in the pressure chamber 78b flows into the oil chamber 79b and the annular chabmer 88 through the orifices 83 and 89. When the engine load is light, the control valve device 90 is opened since the intake vacuum is high. If the flow through the control valve device 90 is set to be large, the length of the oil tappet 75 is largely contracted. As a result, the valve lift of the auxiliary intake valve 9 becomes small and the auxiliary intake valve 9 becomes closed. When the engine load is heavy, the auxiliary intake valve 9 is opened together with the main intake valve since the control valve device 90 is closed. As a result, a large amount of combustible gas mixture is introduced into the combustion chambers.

What we claim is:

1. A dual intake valve system for use in an internal combustion engine, said valve system comprising:

(a) a main intake valve means including means for generating a swirl motion in the intake gas; said intake valve means being operated by a main cam having a cam profile for low speed, said main cam being synchronized with the crankshaft of the engine; and (b) an auxilliary intake valve means operated in synchronization with the crankshaft of the engine, said auxilliary intake valve means including variable valve lifter means for lifting said auxilliary intake valve means as a function of engine operating conditions and engine speed, wherein when the flow of intake gas is small, said auxilliary intake valve means does not operate and said auxilliary intake valve means is normally closed and wherein when the flow of intake gas is large, both said main intake valve means and said auxilliary intake valve means operate to permit the flow of gas simultaneously through both said main intake valve means and said auxilliary intake valve means prior to ignition.

2. A dual intake valve system as set forth in claim 1 wherein said variable valve lifter means includes a swingable rocker arm means, said rocker arm means having a fulcrum which is variable with respect to said rocker arm means along said rocker arm means in a direction parallel to said rocker arm means, said fulcrum being varied as a function of engine operating conditions and engine speed, wherein the amount said auxilliary intake valve means is lifted is a function of the position of said fulcrum along said rocker arm means.

3. A dual intake valve system as set forth in claim 1 wherein said variable valve lifter means includes oil tappet means having a cylinder, the position thereof varying as a function of engine operating conditions and engine speed, wherein the amount said auxilliary intake valve means is lifted is a function of the position of said piston.

4. A dual intake valve system as set forth in any one of claims 1–3 wherein said means for generating a swirl motion includes a main intake portion in said main intake valve means, said intake port having a helical shape and wherein said intake port generates said swirl motion.

5. A dual intake valve system as set forth in any one of claims 1–3 wherein said means for generating swirl motion includes a shroud formed on said main intake valve means and wherein said shroud generates said swirl motion.

6. A dual intake valve system as set forth in any one of claims 1–3 wherein means for generating swirl motion includes a projection in the combustion chamber of said engine surrounding a portion of said main intake valve means, and wherein said projection generates said swirl motion.

* * * * *